United States Patent
Hsiao et al.

(10) Patent No.: US 7,137,190 B2
(45) Date of Patent: Nov. 21, 2006

(54) METHOD FOR FABRICATING A MAGNETIC TRANSDUCER WITH A CORROSION RESISTANT LAYER ON METALLIC THIN FILMS BY NITROGEN EXPOSURE

(75) Inventors: Yiping Hsiao, San Jose, CA (US); Cherngye Hwang, San Jose, CA (US); Jila Tabib, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 414 days.

(21) Appl. No.: 10/264,663

(22) Filed: Oct. 3, 2002

(65) Prior Publication Data

US 2004/0066573 A1 Apr. 8, 2004

(51) Int. Cl.
*G11B 5/127* (2006.01)
*H01R 31/00* (2006.01)

(52) U.S. Cl. .................. 29/603.08; 29/603.07; 29/603.12; 29/603.13; 29/603.15; 29/417; 360/235.7; 360/235.8; 360/236.3; 360/236.5; 360/236.7; 427/127; 427/128; 451/5; 451/41

(58) Field of Classification Search ............ 29/603.07, 29/603.08, 603.12–603.16, 417, 603.18; 360/235.7, 235.8, 236.3–236.7, 235; 427/127, 427/128; 451/5, 41

See application file for complete search history.

(56) References Cited

U.S. PATENT DOCUMENTS

| 4,110,114 | A |   | 8/1978 | Sato |
| 4,130,847 | A |   | 12/1978 | Head et al. |
| 4,285,894 | A | * | 8/1981 | Watanabe et al. ........ 204/192.2 |
| 4,336,316 | A |   | 6/1982 | Sato |
| 4,460,415 | A |   | 7/1984 | Korhonen et al. |
| 4,900,622 | A | * | 2/1990 | Nakayama et al. ......... 428/336 |
| 4,904,543 | A |   | 2/1990 | Sakakima et al. |
| 5,062,900 | A |   | 11/1991 | Berneron et al. |
| 5,936,814 | A |   | 8/1999 | Slade et al. |
| 6,018,862 | A |   | 2/2000 | Stageberg et al. |
| 6,121,150 | A |   | 9/2000 | Avanzino et al. |
| 6,140,234 | A |   | 10/2000 | Uzoh et al. |
| 6,163,437 | A | * | 12/2000 | Inage et al. ................. 360/128 |

(Continued)

FOREIGN PATENT DOCUMENTS

JP 03278480 A * 12/1991

(Continued)

OTHER PUBLICATIONS

"Characteristics of silicon nitride after O2 plasma surface treatment for pH-ISFET applications"; Li-Te Yin; Jung-Chuan Chou; Wen-Yaw Chung; Tai-Ping Sun; Shen-Ken Hsiung;Biomedical Engineering; Mar. 2001; pp. 340-344.*

*Primary Examiner*—Paul D. Kim
(74) *Attorney, Agent, or Firm*—G. Marlin Knight

(57) ABSTRACT

A process is described for fabricating magnetic transducers with metallic thin films with a corrosion resistant surface produced by exposing the thin films to a nitrogen in a plasma chamber. The exposure to the nitrogen is believed to increase the corrosion resistance of the metallic thin films by causing nitrides to form in a thin surface region. In the preferred embodiment the thin film metals of a magnetic transducer are treated with the nitrogen after being cut from the wafer and lapped. Typical metals used in magnetic transducers are NiMn, FeMn, NiFe, cobalt, CoFe, copper, IrMn and PtMn. The films may be further protected by the addition of prior art protective layers such as carbon.

5 Claims, 3 Drawing Sheets

U.S. PATENT DOCUMENTS 6,194,323 B1     2/2001    Downey et al.
6,297,147 B1 * 10/2001   Yang et al. ................. 438/627
6,436,248 B1     8/2002    Baur et al.
6,661,623 B1 * 12/2003   Tsuchiya et al. ....... 360/324.12

FOREIGN PATENT DOCUMENTS

JP        08124116 A  *   5/1996
JP        08167104 A  *   6/1996

* cited by examiner

METHOD FOR FABRICATING A MAGNETIC TRANSDUCER WITH A CORROSION RESISTANT LAYER ON METALLIC THIN FILMS BY NITROGEN EXPOSURE

BACKGROUND OF THE INVENTION

1. Field of the Invention

This invention relates in general to thin films for use in magnetic storage devices, and more particularly to thin film fabrication methods and even more particularly to thin film fabrication methods for increasing corrosion resistance of metallic thin film.

2. Description of Prior Art

A typical prior art head and disk system 10 is illustrated in FIG. 1. In operation the magnetic transducer 20 is supported by the suspension 13 as it flies above the disk 16. The magnetic transducer, usually called a "head" or "slider" is composed of elements that perform the task of writing magnetic transitions (the write head 23) and reading the magnetic transitions (the read head 12). The electrical signals to and from the read and write heads 12, 23 (collectively "magnetic transducer elements") travel along conductive paths (leads) 14 which are attached to or embedded in the suspension 13. Typically there are two electrical contact pads (not shown) each for the read and write heads 12, 23. Wires or leads 14 are connected to these pads and routed in the suspension 13 to the arm electronics (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. The read head 12 reads magnetic transitions as the disk rotates under the air-bearing surface (ABS) of the magnetic transducer 20.

FIG. 2 is a midline section of one type of prior art magnetic transducer 20 shown prior to lapping. The substrate 43 of the slider is typically a hard durable material. The components of the read head 12 shown are the first shield (S1), surround the sensor 105 which is surrounded by insulation layers 107, 109 and the second shield (P1/S2). This type of magnetic transducer is called a "merged head" because the P1/S2 layer serves as a shield for the read head 12 and a pole piece for the write head 23. The yoke also includes a second pole piece (P2) which connects with P1/S2 at the back. The P2 curves down over coil 37 to confront the P1 across the write gap layer to form the write gap at the air-bearing surface (ABS). The zero throat height (ZTH) is defined as the point where the P2 first touches the gap layer. The sensor 105 includes a magnetoresistive material such as permalloy, but may be a multilayered structure containing various layers of ferromagnetic and antiferromagnetic material. The shields and pole pieces are ferromagnetic materials, e.g., NiFe or CoFe while ceramic materials such as TiC or $AL_2O_3$ are used for the substrate. Prior to lapping the materials and structures at the ABS extend beyond the ABS. As illustrated in FIG. 2 the material to the right of the ABS plane is removed by lapping to achieve precise control of the length of the sensor 105 (which is called the "stripe height") and the distance from the ZTH to the ABS (which is called the "throat height"). The uncertainty of the saw plane causes variations in the stripe height which are on the order of microns and which would lead to unacceptable variations in magnetic performance if not corrected. Lapping is the process used in the prior art to achieve much tighter stripe height control in the nanometer range. In the typical process of fabricating thin film magnetic transducers, a large number of transducers are formed simultaneously on a wafer. After the basic structures are formed the wafer may be sawed into quadrants, rows or individual transducers. Further processing may occur at any or all of these stages. Although sawing has been the typical method for separating the wafers into individual sliders, recently reactive ion etching (RIE) or deep reactive ion etching (DRIE) with a flourine containing plasma has been used. The surfaces of the sliders perpendicular to the surface of the wafer that are exposed when the wafers are cut form the air bearing surface (ABS) of the slider. After lapping, features typically called "rails" are formed on the ABS of magnetic transducer 20. The rails have traditionally been used to determine the aerodynamics of the slider and serve as the contact area should the transducer come in contact with the media either while rotating or when stationary.

The metallic components of GMR heads are susceptible to corrosion both in the file environment, and during slider fabrication process. When the rows are cut from the wafer the metallic thin films are exposed and lapping is typically performed. Corrosion has typically been addressed in part by adding a thin protective layer of carbon or silicon over the films after lapping. One drawback of adding the protective layer is that it inherently adds to the spacing between the magnetic sensor and the magnetic media, since the overcoat is typically about 5–7 nm. Increased performance requires smaller sensor to media spacing and thinner overcoats which in turn decrease corrosion reliability. Elimination of the overcoat is desirable for magnetic performance, if alternatives for corrosion resistance can be found.

Not all alloys useful in magnetic heads have the same degree of susceptibility to corrosion, so it is possible to select materials with higher corrosion resistance. In U.S. Pat. No. 4,904,543 Sakakima, et al., describe the use of "nitrided-alloy" layers in magnetic thin film heads to improve resistance to corrosion and wear. A nitrogen-free Fe alloy target with or without additive elements is subjected to sputtering first in an atmosphere of Ar gas for a time sufficient to form a nitride-free Fe alloy layer on a substrate in a desired thickness and then nitrogen gas is added to a level of from 0.1 to 50% by partial pressure, so that a nitrided-alloy layer is formed on the nitride-free Fe alloy layer.

Baur, et al., have described in U.S. Pat. No. 6,436,248 the use of a barrier layer deposited on the substrate before the underlayer films to increase the corrosion resistance of metallic substrate magnetic disks. Preferably the barrier layer is deposited by medium frequency pulsed sputtering at a frequency of 10 to 200 kHz and a pulse length to pulse pause ratio from 5:1 to 1:10. Aluminum or chromium are the preferred materials for the barrier layer. Additional improvements are said to be achieved when the sputtering process gas contains a proportion of oxygen and/or nitrogen In U.S. Pat. No. 4,130,847 Head, et al., teach the use of a layer of passivating material such as chromium which is sputter deposited over the pole tips of the transducer to prevent the corrosion of the iron-nickel alloy comprising the pole tips. A portion of the end tips of the pole pieces and the gap of the thin film inductive transducer is etched by a sputter etching process prior to deposition of the chromium.

SUMMARY OF THE INVENTION

A process will be described for fabricating magnetic transducers with metallic thin films with a corrosion resistant surface produced by exposing the thin films to a nitrogen gas in a plasma chamber. The exposure to the nitrogen is believed to increase the corrosion resistance of the metallic thin films by causing nitrides to form in a thin surface region. In the preferred embodiment the thin film metals of a magnetic transducer are treated with the nitrogen gas after being cut from the wafer and lapped. Typical metals used in magnetic transducers are NiMn, FeMn, NiFe, cobalt, CoFe and copper. The films may be further protected by the addition of prior art protective layers such as carbon.

BRIEF DESCRIPTION OF THE DRAWINGS

For a more complete understanding of the nature and advantages of the invention, as well as the preferred modes of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

Figure 3:
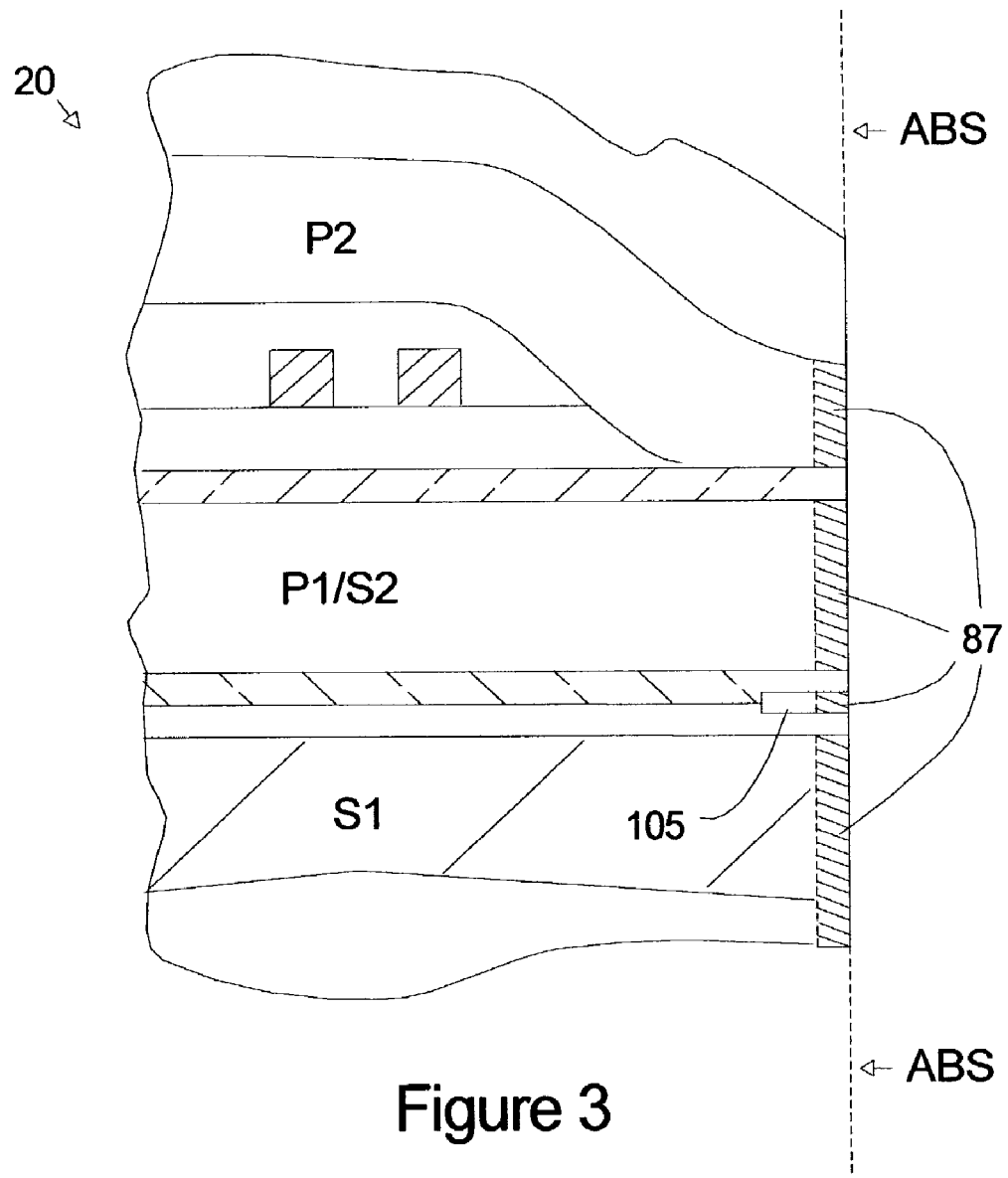
FIG. 3 is a midline sectional view of the air-bearing surface region of the type of magnetic transducer shown in FIG. 2, after lapping and treatment according to the invention.

The invention can be used with any magnetic transducer (head) structure that includes metallic thin films which are exposed by the process of separating the sliders from the wafer. The internal structure of the magnetic transducer elements 20 in FIG. 3 are according to the prior art and the details of these structures are independent of the invention. Although in the preferred embodiment the magnetic transducers are lapped prior to being treated according to the invention, lapping is not required to obtain the benefits of the invention. For example, if a process of separating the transducers from the wafer could be made sufficiently precise to obviate the need for lapping, the invention could still be used.

Figure 1:
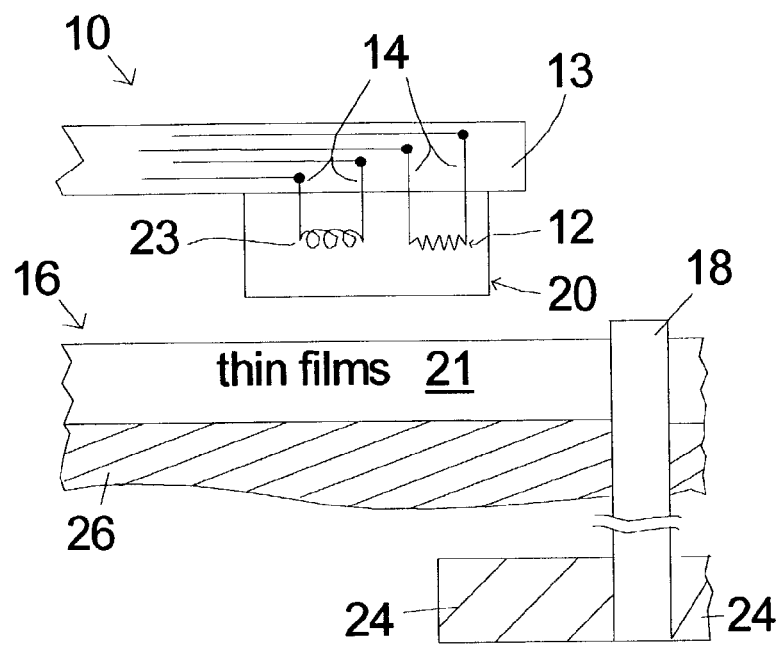
FIG. 1 is a simplified, symbolic drawing illustrating a magnetic disk drive system of a type in which a magnetic transducer in accordance with the present invention can be used.
Figure 2:
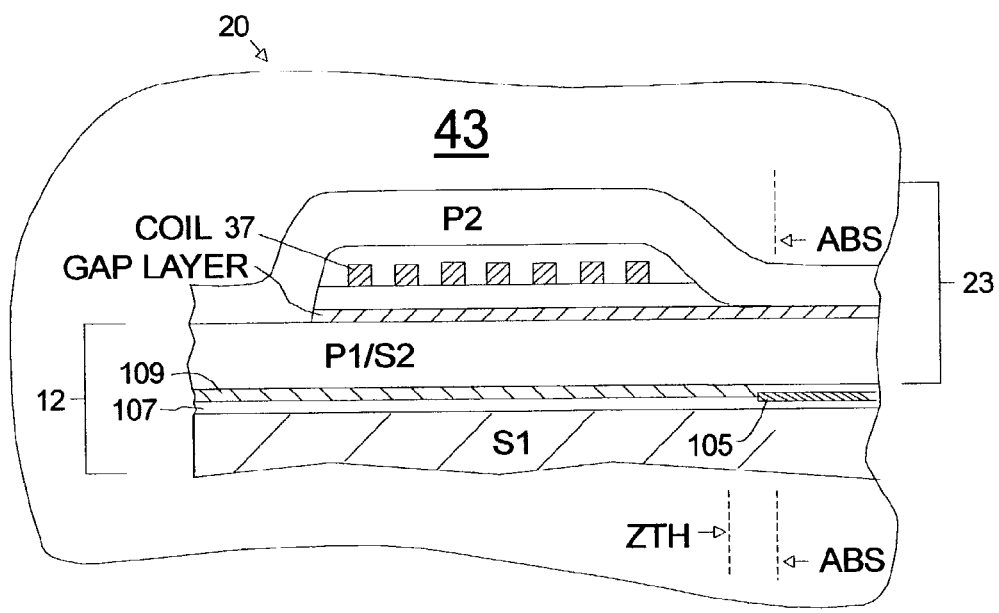
FIG. 2 is a midline sectional view of a type of prior art magnetic transducer during the fabrication process prior to lapping.

Various prior art equipment used in thin film processing which generate a plasma and have at least two electrodes can be used to create the nitrogen containing plasma. For example, plasma-cleaning chambers, physical vapor deposition (PVD) chambers and chemical vapor deposition (CVD) can be used to treat the metallic surfaces with nitrogen according to the invention. The formation and use of the plasma are according to prior art techniques. The plasma, which is a mixture of ions and electrons, may be formed by applying energy, such as radio frequency (RF) or microwave energy to a process gas in the vacuum deposition chamber under the appropriate conditions. The applied energy forms ionic species from the molecules in the chamber and ignites the plasma. In general, reaction rates in plasma processes may be controlled by varying one or more of the process parameters such as: temperature, partial pressures, plasma density, gas flow rate, power frequency, power levels, chamber physical geometry, etc. As is well known in the art, precise process parameters for a desired result with a given apparatus are typically determined empirically. Therefore, the equipment and parameters used by the applicants as described below can only be used as an example to suggest starting points to those skilled in the art in working with their own equipment, materials and performance targets. In the particular process used by the applicants, a plasma-cleaning chamber was used. Approximately 100–500 Watts were applied to an essentially pure $N_2$ gas with a partial pressure of about 100–300 mTorr. In the preferred embodiment the thin film metals of partially completed magnetic transducers are surface treated with nitrogen plasma after have been separated from the wafer (typically by sawing the wafer into rows) and after lapping. At this point in the prior art fabrication process the outer edges of thin films of the transducers are exposed on the lapped surface as illustrated in FIG. 3. The transducer illustrated in FIG. 3 in enlarged form has the same structure as shown in FIG. 2. The coplanar edges of the various thin films at the right-hand side of FIG. 3 are commonly referred to as the ABS even though in the completed transducer this surface is under a protective overcoat such as carbon. The rows of magnetic transducers containing the thin films were treated in the nitrogen plasma for approximately five minutes. The treatment is believed to produce nitrides in the surface layer of the thin film metals extending down into the films to a depth on the order of 1–2 nm as illustrated in FIG. 3 by the hatched areas 87 at the surface of the films. The surface treated area is distinguishable from the remainder of the film which has no significant nitrogen in it. The surface treated areas 87 are not the result of the deposition of additional material and, therefore, will not affect the smoothness of the surface, the stripe height or any other aspects of the geometry of the transducers.

Although nitrogen is the active element, other elements may be present in the plasma, so long as they do not interfere with the incorporation of nitrogen into the thin films. For example, the plasma may include helium, hydrogen and/or ammonia, among others. This allows the nitrogen may be introduced into the chamber as $N_2$ or it may be derived from another compound such as ammonia which will be ionized in the chamber to produce nitrogen ions.

The thin films that can benefit from the treatment according to the invention include any metal which will chemically bond with nitrogen. The metals which are typically preferred for use in GMR heads are NiMn, FeMn, NiFe, cobalt, CoFe, copper, IrMn, and PtMn. After the thin films have been treated by exposure to nitrogen as indicated, one or more optional protective overcoat may be applied according to the prior art.

Figure 4:
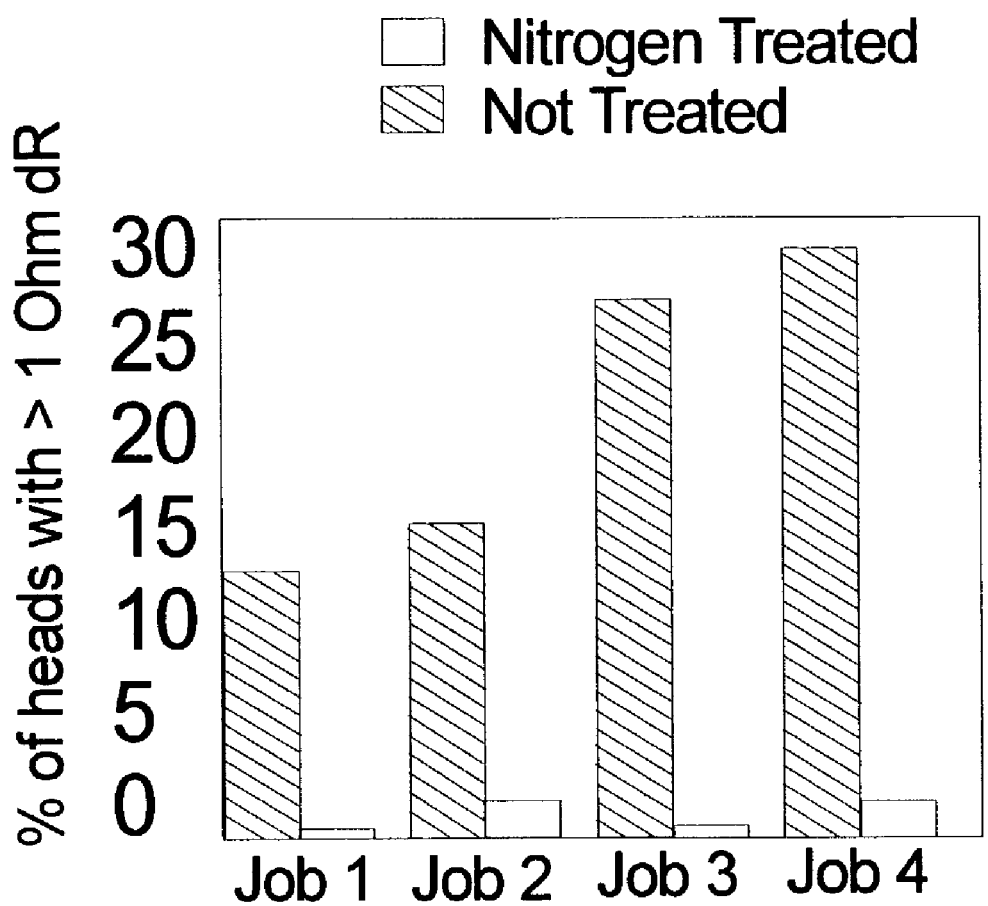
FIG. 4 is a bar graph of the results of an experiment comparing corrosion properties of transducers treated according to the invention with untreated transducers.

To test the corrosion resistance an experiment was done on magnetic transducers with a NiMn layer in order to compare the corrosion behavior with and without nitrogen treatment. An overcoat was not applied to any of the test transducers. The experiment called for exposing the magnetic transducers for two days to 90% relative humidity at 50 degree C. Change in the electrical resistance of the GMR sensor was used as a measure of the corrosion. Although changes in the other metallic films such as the shields were not measured directly, it is reasonable to believe that the metals of the shields will behave similarly to sensor layer. The threshold of one Ohm change was used as the marker of the initiation of corrosion activities. The bar graph in FIG. 4 which shows the percentage of transducers in each of four experimental jobs with greater than one Ohm change. The nitrogen treated group of transducers in each job had typically less than one percent falling above the threshold, while the untreated control groups had significant numbers of transducer falling above the threshold, i.e., from approximately 13 to 29 percent.

It is important to note that the nitrogen-treated transducers as described above had no significant change in the resistance or amplitude values for the GMR stripe.

Except where express materials, thickness values, etc., have been given above, the layers, structures and materials in a slider embodying the invention are according to the prior art and are fabricated according to the prior art. The compositions given herein have been described without regard to small amounts of impurities that are inevitably present in practical materials as is well known to those skilled in the art. Although the invention has been described in a particular embodiment, the invention is not limited to these embodiments and various changes and modifications will be apparent to those skilled in the art which will be within the scope of the invention.

What is claimed is:

1. A method for fabricating magnetic transducers comprising the steps of:

depositing a series of thin films including a metallic thin film for at least one magnetic transducer on a wafer;

cutting the wafer generally perpendicular to the surface of the wafer to expose surfaces of the thin films which have been selected to be at an air-bearing surface of the magnetic transducer; and treating the exposed surface of the metallic thin film with a plasma containing nitrogen.

2. The method of claim 1 wherein the treating step forms nitrides in a region of the metallic thin film including the surface.

3. The method of claim 1 wherein the metallic thin film is a material selected from the group consisting of NiMn, FeMn, NiFe, cobalt, CoFe, copper, lrMn and PtMn.

4. The method of claim 1 further comprising the step of depositing a protective overcoat after the step of treating the surfaces of the thin films with the plasma containing nitrogen.

5. The method of claim 1 further comprising the step of lapping the surfaces of the thin films after the cutting step and before the treating step.

* * * * *